(12) United States Patent
Richter

(10) Patent No.: US 11,352,745 B2
(45) Date of Patent: Jun. 7, 2022

(54) METHODS OF STAGING, PROCESSING, AND TRANSPORTING BIOMASSES

(71) Applicant: MATERA, LLC, Glen Allen, VA (US)

(72) Inventor: Timothy J. Richter, Glen Allen, VA (US)

(73) Assignee: MATERA, LLC, Glen Allen, VA (US)

( * ) Notice: Subject to any disclaimer, the term of this patent is extended or adjusted under 35 U.S.C. 154(b) by 681 days.

(21) Appl. No.: 15/542,545

(22) PCT Filed: Jan. 12, 2016

(86) PCT No.: PCT/US2016/012995
§ 371 (c)(1),
(2) Date: Jul. 10, 2017

(87) PCT Pub. No.: WO2016/115098
PCT Pub. Date: Jul. 21, 2016

(65) Prior Publication Data
US 2018/0266050 A1  Sep. 20, 2018

Related U.S. Application Data

(60) Provisional application No. 62/104,514, filed on Jan. 16, 2015.

(51) Int. Cl.
*D21B 1/02* (2006.01)
*D21C 7/06* (2006.01)
*B65G 53/30* (2006.01)
*D21B 1/34* (2006.01)
*D21B 1/12* (2006.01)

(52) U.S. Cl.
CPC ............ *D21B 1/345* (2013.01); *B65G 53/30* (2013.01); *D21B 1/02* (2013.01); *D21B 1/023* (2013.01); *D21B 1/026* (2013.01); *D21B 1/12* (2013.01); *D21C 7/06* (2013.01)

(58) Field of Classification Search
CPC ...... B65G 53/30; D21B 1/1023; D21B 1/345; D21C 7/06
See application file for complete search history.

(56) References Cited

U.S. PATENT DOCUMENTS 4,265,737 A * 5/1981 Smith .................. B01D 11/028
209/11
4,650,367 A   3/1987 Dietzler
(Continued)

FOREIGN PATENT DOCUMENTS

WO   2009100042 A2   8/2009
WO   2016115098 A1   7/2016

OTHER PUBLICATIONS

Smook, Handbook for Pulp and Paper Technologists, 1992, Angus Wilde Publications, 2nd edition, chapter 3. (Year: 1992).*

(Continued)

*Primary Examiner* — Anthony Calandra
(74) *Attorney, Agent, or Firm* — Dorsey & Whitney LLP

(57) ABSTRACT

Embodiments disclosed herein relate to methods and systems for processing and transporting biomass to an end user. In an embodiment, a method of processing and transporting biomass to an end user is disclosed. The method includes tapping a biomass for processing, processing the biomass into a biomass slurry, and transporting the biomass slurry to an end user off site through a transport conduit therebetween.

10 Claims, 4 Drawing Sheets

(56) References Cited

U.S. PATENT DOCUMENTS

| 4,702,421 | A | 10/1987 | Wruck et al. | |
|---|---|---|---|---|
| 6,045,070 | A | 4/2000 | Davenport | |
| 10,555,510 | B2 * | 2/2020 | Halse | B65G 53/30 |
| 2007/0045157 | A1 * | 3/2007 | Kajzer | D21B 1/023 |
| | | | | 209/3 |
| 2011/0188949 | A1 | 8/2011 | Foody | |
| 2014/0038244 | A1 | 2/2014 | Chesonis et al. | |

OTHER PUBLICATIONS

Ileleji, et al., "Farm-Gate to Plant-Gate Delivery of Lignocellulosic Feedstocks from Plant Biomass for Biofuel Production," Biofuels for Agricultural Wastes and Byproducts, Sep. 2010, pp. 117-159.
International Search Report for International Patent Application No. PCT/US2016/012995, dated Mar. 11, 2016 (2 pages).
Written Opinion of the International Searching Authority for International Patent Application No. PCT/US2016/012995, dated Mar. 11, 2016 (7 pages).
Atchison et al., "Innovative Methods for Corn Stover Collecting, Handling, Storing and Transporting," National Renewable Energy Laboratory, Mar. 2003 (63 pages).
Hettenhaus, "Why 2g Sugar Process Should Begin with Wet Feedstock Storage," Powerpoint, New Orleans, LA, Jun. 2015 (24 pages).
Wendt et al., "Development of a Wet Logistics System for Bulk Corn Stover Technology Area Review: Feedstock Supply and Logistics," U.S. Department of Energy, Idaho National Laboratory, Mar. 25, 2015 (17 pages).
Supplemental European Search Report for European Patent Application No. 16737710.0, dated Jul. 30, 2018 (10 pages).

* cited by examiner

METHODS OF STAGING, PROCESSING, AND TRANSPORTING BIOMASSES

CROSS-REFERENCE TO RELATED APPLICATIONS

This application claims priority to U.S. Provisional Application No. 62/104,514 filed on 16 Jan. 2015, the disclosure of which is incorporated herein, in its entirety, by this reference.

BACKGROUND

Current industry techniques for transporting biomass focus on baled harvesting of the biomass, which may include drying time in the field, baling the biomass, loading the biomass onto trucks, and transporting the biomass to an end user (e.g., pelletizing to facility, digester, bioprocessing facility, or cellulosic ethanol facility) where it has to be further processed to be suitable for use therein. At an end user, such as a bioprocessing facility, the bales are destrung, unbaled, sized (e.g., pulverized to size in a hammer mill) at least once, cleaned, watered or dewatered, and then sent to the bioreactor or mechanical densification equipment (e.g., pellet mill or press) for use therein.

However, current industry techniques for harvesting, transport, and processing of biomasses cause a significant amount of pollution from the multiple pieces of rolling equipment required to transport the biomass from field to storage to end use site. Further, current industry techniques are very labor and energy (e.g., fuel) intensive.

Manufacturers and users of devices, systems, and methods for harvesting, processing and transporting biomasses continue to seek improved harvesting, processing, and transport systems and methods.

SUMMARY

Embodiments disclosed herein relate to methods and systems for processing and transporting biomass to an end user. For example, biomass includes, but is not limited to, grasses, feed crops or stems or residues thereof (corn, soybeans, alfalfa, grain, etc.), wood, or any other harvestable vegetation which may be in bulk or pelletized form.

In an embodiment, a method of processing and transporting biomass to an end user is disclosed. The method includes tapping a biomass for processing, processing the biomass into a biomass slurry, and transporting the biomass slurry to an end user off site through a transport conduit therebetween.

In an embodiment, a system for processing and delivering biomass is disclosed. The system includes a mobile biomass slurry apparatus configured to break down biomass below a specific average particle size and combine water with the broken down biomass to form a biomass slurry. The system further includes at least one booster pump in fluid communication with the mobile biomass slurry apparatus. The system also includes at least one transport conduit coupled to, and in fluid communication with, the at least one booster pump, the at least one transport conduit terminating at an end-use side.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments disclosed herein relate to methods and systems for processing and transporting biomass to an end user. Biomass includes, but is not limited to, one or more of grasses (e.g., switchgrass, miscanthus, elephant grass, phragmite, *Arundo donax*, sugar cane, sorghum, etc.), feed crops or stems or residues thereof (corn, soybeans, alfalfa, grain, etc.), wood, or any other harvestable vegetation that may be in bulk and/or pelletized form. One or more embodiments include on-site staging of biomass, on-demand tapping of on-site storage of biomass, on-site preparation of biomass, and transport of the prepared biomass to an end user off site from the location of the on-site storage of the biomass.

Generally, in an embodiment, a method of staging, processing, and transporting biomass to an end user includes staging the biomass on-site, tapping the stored biomass for processing, processing the biomass into a slurry, and transporting the biomass slurry to an end user. For example, staging the biomass may include harvesting and storing the biomass on-site such as in a bunker or pad (e.g., silage heap or pile). Tapping the biomass may include removing a portion of the biomass from the bunker or pad for processing. Processing the biomass may include slurrying the biomass for liquid transport. Slurrying the biomass includes grinding, chopping, or pulverizing the biomass into smaller particles, fibers, or strands and combining the same with a liquid (e.g., adding water to a chopped grass biomass). Transporting the biomass to an end user includes pumping the biomass slurry through a transport conduit to the end user. More details of methods of staging, tapping, processing, and transporting of biomass to an end user are described below with respect to the embodiments of FIGS. 1-3.

Figure 1:
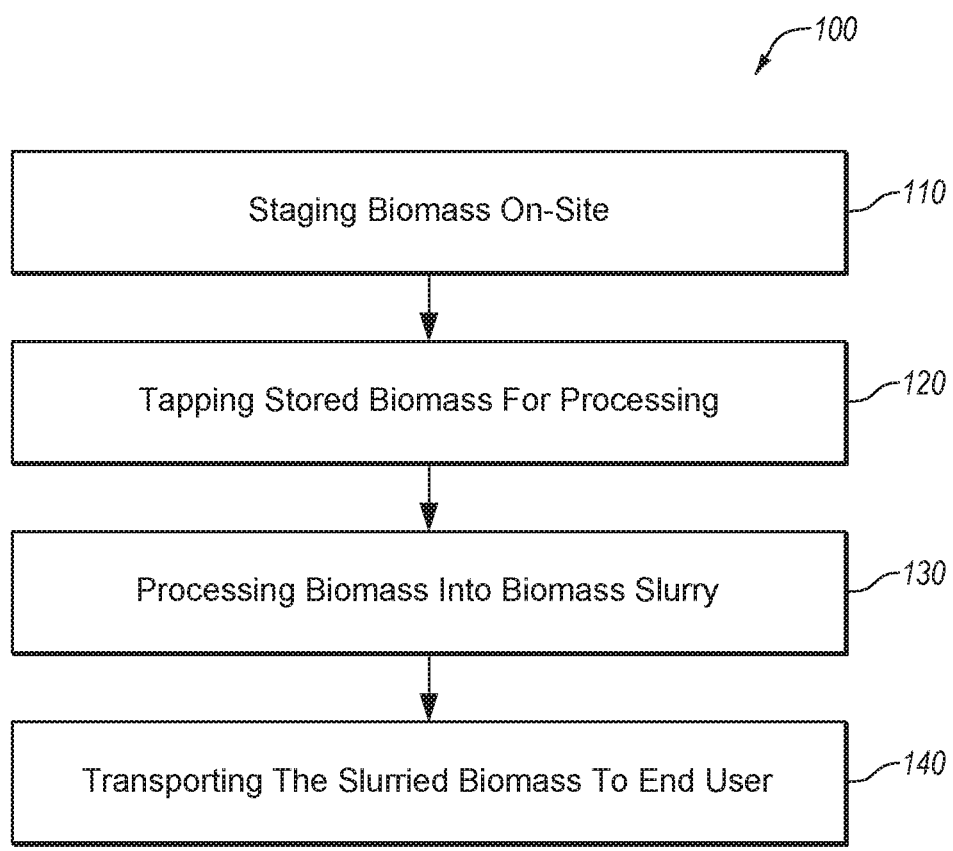
FIG. 1 is a flow diagram of a method of staging, transporting, and transporting biomass to an end user, according to an embodiment.
Figure 2:
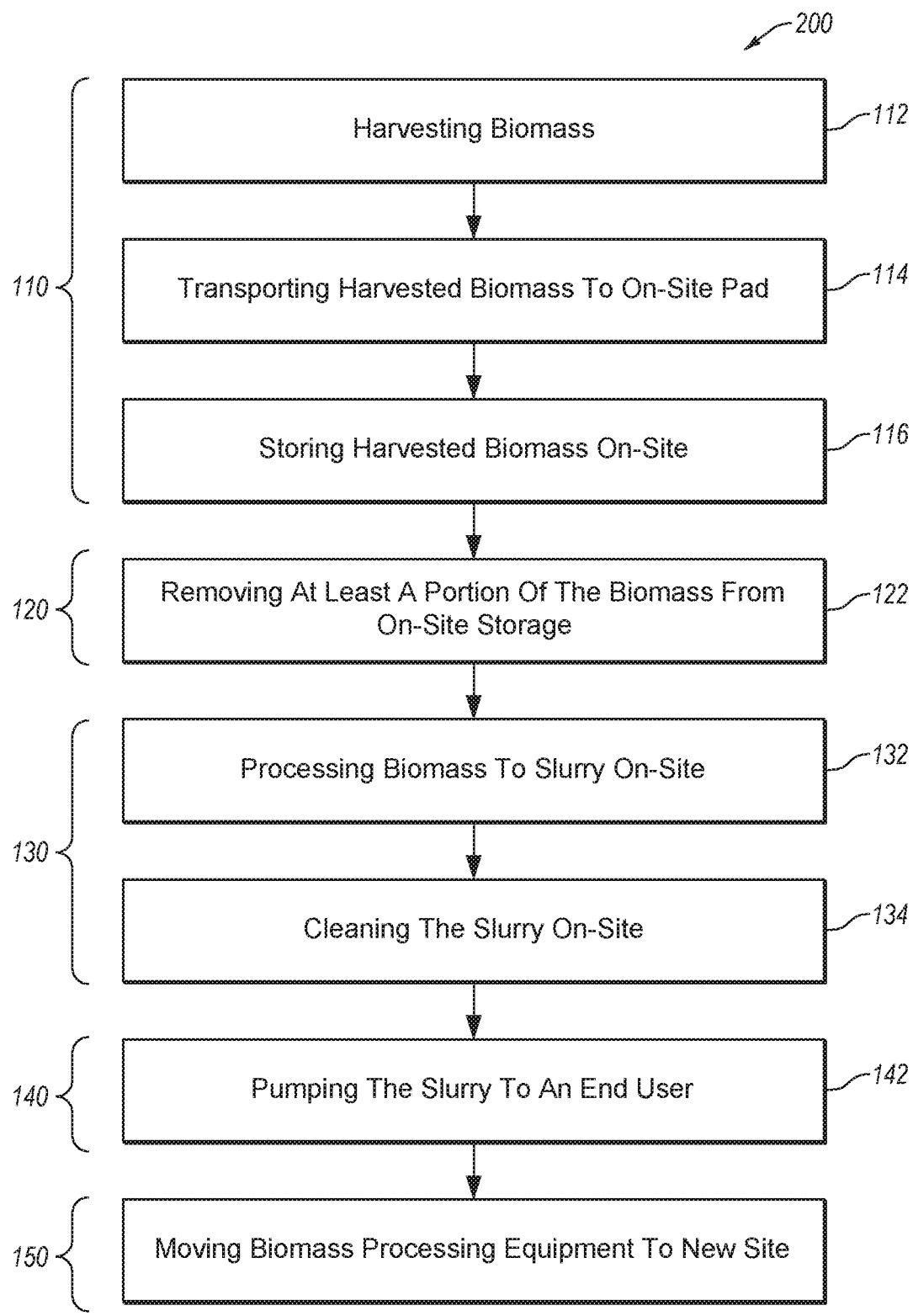
FIG. 2 is a flow diagram of a method of staging, transporting, and transporting biomass to an end user, according to an embodiment.

FIGS. 1 and 2 are flow diagrams of methods of staging, processing, and transporting biomass to an end user, according to embodiments. Referring to FIG. 1, a method 100 of staging, tapping, processing, and transporting biomass to an end user is disclosed. The method 100 includes an act 110 of staging biomass on-site. "On-site" refers to a site at or near the site of biomass harvest (e.g., in the field or a centralized storage location between fields such as a central location within two miles of each of a group of fields, such as less than one mile away from each of a group of fields) where processing to a slurried biomass (at a biomass slurry apparatus) takes place and, in some embodiments, at the site of the biomass harvest that may also include the biomass slurry apparatus therein. In some embodiments, the on-site location may be as far as 15 miles from the end-use site, such as 15 miles from a biomass processing facility, within one to ten miles, within one to five miles, within two to eight miles, within five to ten miles, or within one to two miles of a biomass processing facility. In an embodiment, staging the biomass on-site includes concentrating the biomass into at least one centralized location or portion of the biomass (e.g., a heap, pile, stack, or combinations thereof) proximate to (e.g., within 200, 100, or 50 yards of) a biomass slurry apparatus. For example, staging the biomass includes concentrating the biomass to the centralized location in any state desired, such as in a wet state (e.g., as harvested, as rained on, or as maintained by rewetting), in a dry state (e.g., as harvested or as dried in the field), or a mixture thereof. The acts of any of the embodiments of methods disclosed herein may be performed without regard to the moisture content in the on-site biomass. In an embodiment, the method 100 may be performed without act 110, such as by placing the harvested biomass directly into a biomass slurry apparatus.

The method 100 further includes an act 120 of tapping the stored biomass for processing. For example, the act 120 may include using a piece of equipment (e.g., a front-end loader) to transfer the biomass from the centralized location to another location on-site, such as to a biomass slurry apparatus for further processing into a slurry. Tapping the stored biomass for processing may be performed responsive to a request from an end user or the infeed requirements of a downstream process.

The method 100 further includes an act 130 of processing the biomass into a slurry. For example, the act 130 may include feeding the biomass into biomass slurry apparatus designed and configured to break the biomass into smaller particles or fibers and combine the broken down biomass with a liquid, such as water. Suitable biomass slurry apparatuses include a broke pulper, broke repulper, shredder, or chipper. Broke pulpers and repulpers are commercially available as discussed in more detail below.

The method 100 further includes an act 130 of transporting the biomass slurry to the end user. An end user includes a user of the biomass slurry (e.g., a bioreactor at a bioprocessing or cellulosic ethanol facility or a paper plant), a storage medium (e.g., a batch tank at a bioreactor site or storage tank at a distribution hub), a distribution hub, or combinations thereof. In an embodiment, transporting the biomass slurry includes flowing the biomass via liquid transport through a transport conduit, such as one or more pipes, tubes, hoses, lines, or troughs (e.g., lined ditches or canals). For example, the transport conduit may include one or more sections of any of the foregoing. As a further example, transporting the biomass slurry may include pumping the slurry through one or more transport conduits to an end-use site. The biomass slurry may be gravity fed and/or pumped through the one or more transport conduits to the end-use site. As explained in more detail below, one or more booster pumps may be used to maintain or otherwise control the velocity of the biomass slurry in the transport conduits. The method 100 may reduce or eliminate one or more costs associated with transporting harvested biomasses to an end-use site, such as rolling equipment associated costs (e.g., fuel and equipment maintenance) from the site of harvest to the end-use site.

FIG. 2 is a flow diagram of a method 200 of staging, processing, and transporting biomass to an end user, according to an embodiment. The method 200 includes the acts 110-140 of the method 100 described above, broken down into more detailed aspects. As shown, the act 110 of staging biomass on-site may include an act 112 of harvesting the biomass, an act 114 of transporting the harvested biomass to an on-site pad, and an act 116 storing the harvested biomass on-site. The act 120 of tapping the stored biomass for processing may include an act 122 of removing at least a portion of the stored biomass from the on-site storage to processing equipment on-site. The act 130 of processing the biomass into a slurry (e.g., entrained biomass slurry) may include an act 132 of processing the biomass to a biomass slurry on-site and an act of 134 cleaning the biomass slurry on-site. The act 140 of transporting the biomass slurry to the end user may include an act 142 of pumping the biomass slurry to an end user. One or more of the foregoing acts may be omitted from the methods described herein according to various embodiments. The methods described herein are not limited to the acts described above.

The act 110 includes the act 112 of harvesting the biomass. In an embodiment, the act 112 includes cutting down the biomass, such as at or near soil level. In some embodiments, the biomass may be harvested such that the biomass will grow again, such as the case with grasses. For example, harvesting the biomass may include cutting the biomass down whole and leaving it in whole form or cutting the biomass down and processing the biomass into smaller pieces prior to delivery, such as with a corn chopper or forage harvester. Harvesting the biomass may be performed without regard to moisture content of the biomass.

The act 110 further includes the act 114 of transporting the biomass to an on-site pad (e.g., ensilement). In some embodiments, the on-site pad may be located at or near (e.g., two miles or less, or one mile or less, or one half mile or less) the field where the biomass is harvested. In some embodiments, the on-site pad may be located between a plurality of fields where biomass is harvested, such as substantially equidistantly from each of a plurality of fields. In some embodiments, the on-site pad may be located near paved or graded road surfaces for improved portability of the processing equipment (described below). Such on-site pads may include a concrete, asphalt, dirt, gravel, or otherwise covered surface where a biomass may be deposited (e.g., piled or heaped). Such an on-site pad may be as small as a portion of an acre or as large as several hundred acres. According to various embodiments, transporting the biomass to the on-site pad may be accomplished using one or more of a dump truck, a harvester bed or hopper, a field buggy, a front-end loader, a conveyor belt, or a harvester such as a forage harvester having a feeder mechanism and chute configured to throw the biomass a distance to a desired point (similar to a snow blower). For example, transporting the biomass may include using a harvester with a chopper thereon configured to cut the biomass, chop the biomass into smaller pieces, and propel the cut and chopped biomass into the bed of a dump truck for transport from the field to an on-site pad. Transporting may include using the same harvester above and steering the chute to an on-site pad in a field. Transporting the biomass to an on-site pad may be performed without regard to moisture content of the biomass. In some embodiments, the act 114 may be omitted, such as directly depositing freshly harvested biomass into a slurry apparatus (e.g., chopper, repulper, etc.). Transporting the biomass only to an on-site pad may reduce or eliminate shipping costs and equipment needs associated with moving the harvested biomass from field to end-use site via conventional methods such as bailing and trucking.

The act 110 includes the act 116 of storing the biomass on-site. In an embodiment, storing the biomass on-site may include storing the harvested biomass on-site in an as-harvested state (e.g., wet or dry) in one or more piles, heaps, or biomass bunkers. For example, a bunker may include a horizontal or vertical silo or similar storage vessel, or a silage heap (with or without walls thereabout or a covering thereover). In some embodiments, the biomass is piled or heaped such that the biomass internal to the heap does not rot or decay as fast as it would in open air. For example, the biomass may be left uncompacted or may be compacted on the pile or heap. As a further example, the biomass may be stored in an as-harvested state for months prior to processing and transport to an end user. The biomass may be piled into a storage or silage heap or silo having a sub-acre to hundreds of acre footprint, without respect to on-site pad size. The biomass may be piled several feet high or more, such as tens of feet high.

The act 120 includes the act 122 of removing at least a portion of the stored biomass from the on-site storage. In an embodiment, the act 122 of removing at least a portion of the stored biomass from the on-site storage may include removing the biomass and placing into processing equipment (e.g., slurry apparatus and/or cleaning apparatus) on-site. In some embodiments, the biomass may be stored in a baled configuration and/or in an as-harvested state. In such embodiments, removal may include unbailing and/or a preliminary cleaning step, such as in a water-table. Removal may be accomplished using any suitable transport equipment such as a front-end loader, an excavator, a bull dozer, a vacuum, a potato scoop or potato shovel, a conveyor belt, a sluice way, a canal, an inclined or sloped pad, or a feeder having a mechanism and chute configured to throw the biomass a distance to a desired point (similar to a snow blower). Removing at least a portion of the stored biomass from the storage on-site to processing equipment on-site includes transporting the biomass to a slurry apparatus. Transporting the biomass to a slurry apparatus may include scooping the biomass from a storage heap or pile and dumping the biomass into or adjacent to a slurry apparatus using any of the above transport equipment. For example, a front end loader may scoop a bucket of biomass from a heap of biomass on the on-site pad and deliver the bucket of biomass to a slurry apparatus on-site. In an embodiment, the biomass may be placed on a feed apparatus for the slurry apparatus, such as a gravity (e.g., sloped deck) or belt feed. In such an embodiment, the as-harvested biomass may be placed directly onto the feed apparatus, or may be staged in a heap as disclosed above and then may be removed therefrom to the feed apparatus. The front-end loader may remove the biomass from any portion of the heap, either by driving onto the pile or up to a face of the heap, in order to remove a portion thereof. Removing the biomass may be done at a rate required by the infeed rate of the processing equipment, or may be done responsive to a request from a downstream user.

As noted above, the act 130 of processing the biomass into a biomass slurry may include any of the acts 132 of processing the biomass to slurry on-site and 134 cleaning the biomass slurry on-site. In an embodiment, the act 132 of processing the biomass to slurry on-site includes slurrying the biomass in a slurry apparatus to form an entrained biomass slurry. For example, the act 132 of processing the biomass to slurry on-site may include receiving the biomass at the biomass slurry apparatus, such as with the necessary hoppers, slides, and chutes to feed the slurry apparatus. A slurry apparatus may include any device(s) suitable to break down plant matter or other biomass into smaller portions or fibers and combine the broken down plant matter with a liquid, such as a broke pulper or a broke repulper. Suitable broke pulpers include those commercially available from Voith, S.L. Industries, or MTR Martco. In an embodiment, the act 132 of processing the biomass to slurry on-site may include breaking the biomass particles into a selected size. For example, the slurry apparatus may be configured to break the biomass down to a specific particle or fiber size. Such a slurry apparatus may include a pulper having a blade and/or grate or screen configuration designed to filter a specific particle size therethrough and prevent larger particles from passing therethrough. For example, a slurry apparatus may be configured to break the biomass down to a (average) particle size (of all measurement axes length, width, and heights) of about 10 mm or less, such as about 100 μm to about 50 mm, 100 μm to about 10 mm about 500 μm to about 5 mm, about 100 μm to about 2 mm, about 1 mm to about 4 mm, about 2 mm to about 5 mm, about 4 mm to about 10 mm, about 10 mm to about 50 mm, about 1 mm to about 25 mm, about 5 mm to about 30 mm, about 10 mm to about 40 mm, less than about 50 mm, less than about 5 mm, less than about 2 mm, or less than about 1 mm. In an embodiment, the act 132 of processing the biomass to slurry on-site may include saturating the slurry to a selected liquid content level. Suitable liquid content levels in the slurry (e.g., slurried biomass) may include a biomass weight % of about 25 weight % to about 65 weight % of the slurry, about 40 weight % to about 50 weight % biomass, or about 45 weight % biomass of the slurry. The biomass slurry may be drained and filtered through a screen or grate in the slurry apparatus, routed through a cleaning device or routed directly to a transport conduit for delivery to an end user. Sizing in the slurry apparatus and cleaning mechanism may be carried out to selected infeed size of the end user (e.g., desired infeed size of biomass at bioreactor). The slurry apparatus may be fluidly connected to a cleaning apparatus, such as via a flexible delivery line, tubing, or piping.

In an embodiment, the act 134 of cleaning the biomass slurry on-site may include receiving the biomass in a cleaning apparatus on-site, such as in a cyclonic cleaner. Suitable cyclonic cleaners may include those capable of cyclonic separation techniques to remove debris from biomass such as oversized biomass pieces, dirt, sand, rocks and other detritus. The debris drops out of the slurry via the cyclonic action of the cyclonic cleaner and the entrained slurry is fed into a transport conduit for transport to an end user. Suitable cyclonic cleaners include hydrocyclone cleaners commercially available from Kadant, Inc. In an embodiment, the filtered water and/or debris may be sent back to the slurry apparatus for further break down or may be sent to a settling pond. In some embodiments, the cyclonic cleaner may be disposed downstream from the slurry apparatus and upstream from a booster pump. In such embodiments, the cleaned biomass slurry may be fed into the transport conduit through the booster pump.

In an embodiment, cleaning or treatment chemicals (e.g., surfactants, anti-fungal, or anti-microbial additives) may be added to the entrained slurry in one or more of the slurry apparatus, the cleaning apparatus, or transport conduits. In an embodiment the slurry apparatus and/or cleaner may be mounted on a mobile platform such as wheels, skids, or one or more semi-trailers (e.g., a flatbed trailer) for mobility and moving from site to site as needed. Similarly, at least a portion of the transport conduits may be movable from site to site. That is, at least some of the transport conduits may be non-permanently installed (e.g., at least partially above ground) and later removed and transported to a different site. Such mobile equipment may enable on-site entrainment of biomass without transporting the biomass from the harvest site (or from more than a mile or two of the harvest site) prior to entrainment, which may eliminate bailing and unbailing biomass. As explained in more detail below, biomass slurry systems having mobile slurry and cleaning apparatuses may enable versatile on-site processing of biomasses with limited transportation and infrastructure costs.

The act 140 of transporting the biomass slurry to an end user includes the act 142 of pumping the biomass slurry to an end user. Pumping the biomass slurry to an end user includes pumping the biomass slurry through a transport conduit. In an embodiment, transport conduits may include one or more flexible or rigid delivery lines (e.g., hoses, tubes, pipes, or troughs). For example, a flexible delivery line may include one or more of a flexible polymer line, such as high-density polyethylene (HDPE), polyester jacketed polyurethane, or braided polyvinylchloride (PVC) lines or pipe; reinforced rubber hosing; braided metal hose such as stainless steel; any other suitable resilient fluid conduit. Suitable rigid delivery lines may include polymers or polymer coated materials; metals (e.g., aluminum, copper, stainless steel); or other rigid pipes. The transport conduit and/or individual sections thereof may be of any suitable length, such as less than 100 feet to a mile or more, or about 500 yards to about 15 miles depending on the distance from the biomass storage site to the end user. The transport conduit may include a plurality of individual transport conduit sections (referred to herein collectively as transport conduit(s)) which may be identical to or differ from one another in one or more aspects. (e.g., length, diameter, or construction). A suitable diameter for the transport conduit(s) may be at least about ½ inch, such as about 2 inches to about 18 inches, about 3 inches to about 6 inches, or about 6 inches to about 12 inches. In an embodiment, the cleaned biomass slurry is received in the transport conduit from cyclonic cleaner, and the cleaned biomass slurry is pumped through the transport conduit to an end user. The biomass slurry may be manufactured to have a specific liquid content selected to provide a desired line velocity in the transport conduit. Pumping may include using one or more booster pumps to maintain or boost the speed of the slurry in the transport conduits. For example, a centrifugal pump may be positioned directly after the slurry apparatus and/or cleaning apparatus and be in fluid communication therewith, whereby the centrifugal pump boosts the velocity of the entrained biomass in the transport conduits. In some embodiments a booster pump may be positioned at the end user to draw the entrained biomass slurry to the end user location. In embodiments, one or more booster pumps may be included at any point along the transport conduit, such as at one or more hubs to augment the line velocity of the entrained biomass slurry in the transport conduit(s). One or more hubs each having a booster pump may be positioned at substantially equidistant intervals throughout the entirety of the transport conduit, at steeper grades (e.g., pumping up a hill), access points (e.g., near a road or secure area), or combinations thereof. The length and width of the transport conduit; the terrain topography that the transport conduit extends over; and/or the biomass type, particle size, and slurry liquid content may influence the number and/or size of booster pumps required. Suitable booster pumps may include centrifugal slurry pumps such as those commercially available Warman® or equivalents thereof.

In some embodiments, the method 200 may additionally include the act 150 of moving the biomass processing equipment to a new site. Moving the biomass processing equipment to a new site may include moving one or more of the slurry apparatus, the cleaning apparatus, a booster pump, and at least a portion of the transport conduit(s) to the new site. In some embodiments, the biomass processing equipment may be mobile, that is, includes skids, wheels, or may be mounted on a trailer. In some embodiments, one or more of the slurry apparatus, the cleaning apparatus, or a booster pump may be mounted on the same or different skids, wheels, or trailer as one of the other pieces of biomass processing equipment. Moving the biomass processing equipment to a new site may include towing or pulling the biomass processing equipment to the new site. Moving the biomass processing equipment may include moving at least a portion of the transport conduit (e.g., the individual section thereof between the biomass processing equipment and the first hub) to the new site. Moving the processing equipment to a new site may reduce or eliminate costs or equipment associated with shipping the harvested biomass from the field to the end-use site via conventional methods, such as bailing and trucking.

Additional acts may include receiving the entrained slurry at the end user, such as in a diverter valve assembly where it is further directed to another point (e.g., HDPE storage containers or batch tanks), or directly into a batch tank for storage at the end user sight. In an embodiment, the entrained slurry may be transported through the transport conduit(s) directly to a bioreactor where it is processed for further use therein. In an embodiment, the entrained slurry may be dewatered at the end user, such as in a batch tank prior to being sent to the bioreactor. In an embodiment, water from the dewater process may be pumped into a process water pond or pumped back to the storage site. Additional acts and apparatuses for the methods herein may include cleaning or clearing the biomass processing equipment and transport conduits of fibrous biological debris, and equipment for doing the same. Additional acts may include moving the storage site or the end user site including all equipment associated therewith and/or connecting the storage site with an end user site at one or more different locations via the transport conduit.

In addition to eliminating the number of steps required in tradition harvest methods, including their costs and emissions from traditional transport (e.g., trucks) of biomass from the storage site to the end user, the methods disclosed above at least reduce or completely eliminate the need for some processing at the end user. For example, the biomass material may be sized at the slurry apparatus reducing or eliminating the need for hammer-milling or further sizing at the end user site. Additionally, sizing of wet or moist biomass requires much less mechanical energy than similar volumes of dry biomass, resulting in further energy savings. The biomass slurry is at least partially cleaned in the cleaning apparatus prior to delivery, reducing or eliminating the need for cleaning at the end user. Liquid delivery of biomass as disclosed herein also mitigates the combustion risks associated with baled biomass and dry material in storage and hammer milling. The methods disclosed herein eliminate particulate pollution from bale storage, bale opening, and sizing activities that require air permitting.

Figure 3:
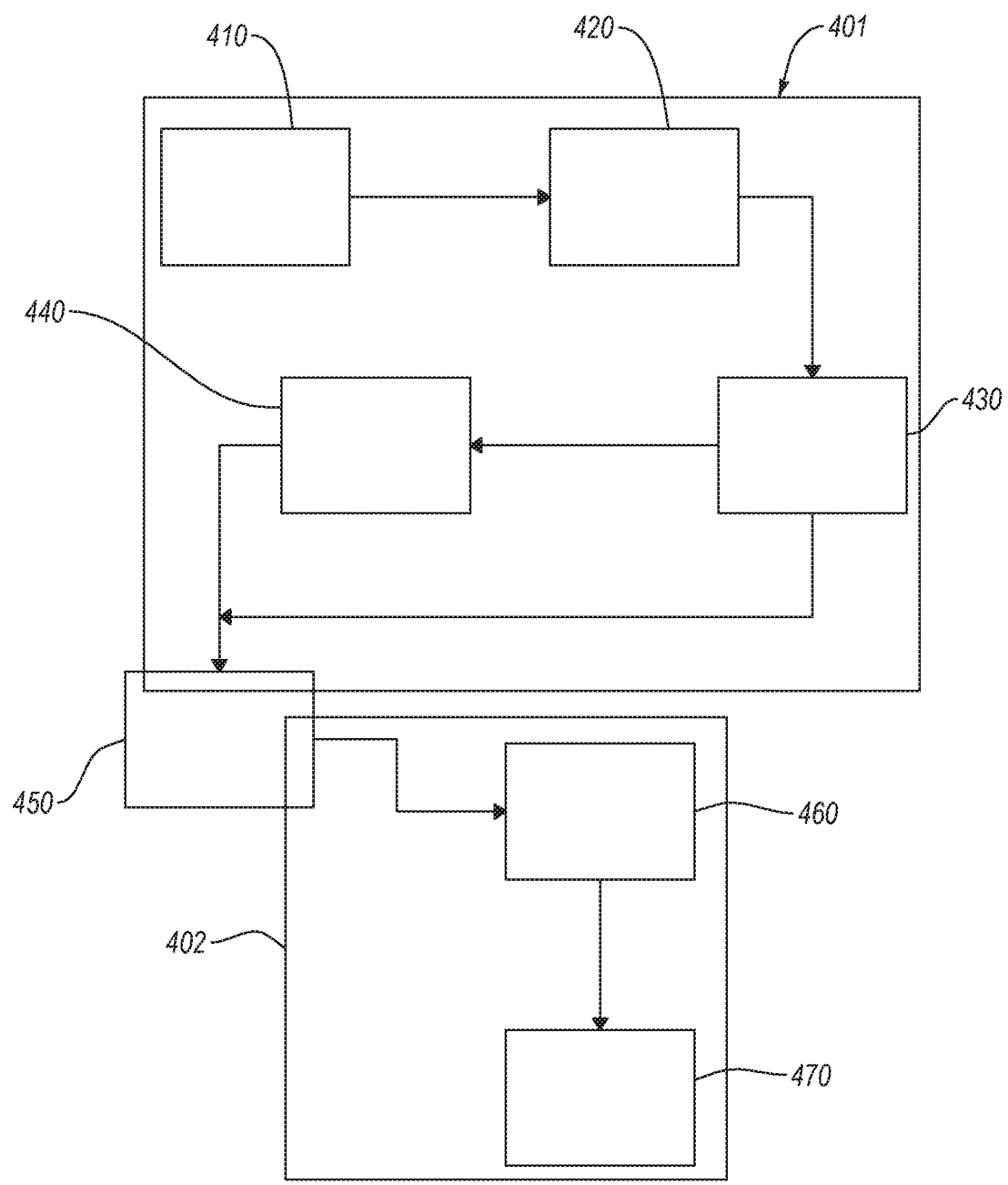
FIG. 3 is a schematic block diagram of equipment used in a method of staging, transporting, and transporting biomass to an end user, according to an embodiment.

FIG. 3 is a schematic block diagram of a method of staging, processing, and transporting biomass. The site 401, referred to as "on-site" herein, includes the unharvested biomass crop 410, such as a field or fields of grass, corn, sugar cane, soybean, flax, or any other suitable biomass. After harvesting the biomass, the harvested biomass may be transported to on-site storage 420 (e.g., on-site pad) where it may be aggregated with biomass from other, adjacent rows or fields. Stored biomass is then transported to a biomass slurry apparatus 430 on-site, where it is slurried to a desired average particle size and liquid content as described herein. The entrained biomass slurry may be sent to the cyclonic biomass cleaner 440 on-site or directly to the biomass transport conduit 450 via a booster pump as described herein. In an embodiment, the biomass is sent to the cyclonic biomass cleaner 440 where it is cleaned and then transported to the biomass transport conduit 450. Each of the biomass crop 410, on-site storage 420, biomass slurry apparatus 430, cyclonic biomass cleaner 440, and at least portion of the biomass transport conduit 450 (including at least one booster pump) are located at the site 401 (e.g., on-site). The biomass slurry apparatus 430, cyclonic biomass cleaner 440, and at portion of the biomass transport conduit 450 (including at least one booster pump) may be mounted on a movable assembly or be individually movable, such as having wheels, skids or be positioned on a trailer for transport.

The transport conduit(s) 450 extend from the site 401 to the end use site 402. The transport conduit(s) 450 may extend any distance necessary to fluidly connect the on-site terminus thereof with the end user site terminus thereof. As noted above, the transport conduit(s) may extend yards or miles. The transport conduit may include a plurality of re-linked individual sections forming a continuous fluid connection between the on-site terminus and the end-use terminus of the transport conduit. Each of the individual sections may be configured to mate with and/or fasten to an adjacent individual section of the transport conduit(s). Each individual section may include any of the lengths, diameters, or compositions disclosed above. In an embodiment, the transport conduit extends about 3000 feet, or each individual section of the transport conduit(s) 450 extends about 3000 feet or more. In some embodiments, each individual section may be similar or identical to each adjacent individual section in one or more aspects (e.g., identical materials or diameters). In some embodiments, some individual sections may differ from adjacent individual sections in one or more aspects. As discussed in more detail below, in some embodiments, one or more of the individual sections may include a hub therebetween. The hub may include a booster pump configured to boost, maintain, or otherwise control the velocity of the biomass slurry in the transport conduit(s).

The entrained biomass slurry is received at the end user site in a biomass slurry storage 460. The biomass slurry storage may include one or more of a tank or apparatus suitable to store or house the specific biomass slurry. Suitable materials for biomass storage tanks or vessels include concrete; carbon steel; stainless steel; alloyed metal; stiff-walled watertight metal vessels; or HDPE, polypropylene, or other plastics. The biomass slurry at the end user site may be transported from the biomass storage 460 for further processing or end use 470. Further processing may include dewatering, watering, sizing, chemical treatment, enzyme addition, antifungal or antimicrobial treatment, pH adjustment, or any other processing necessary for the biomass to be usable at the end use site, such as in a bioreactor.

Figure 4A:
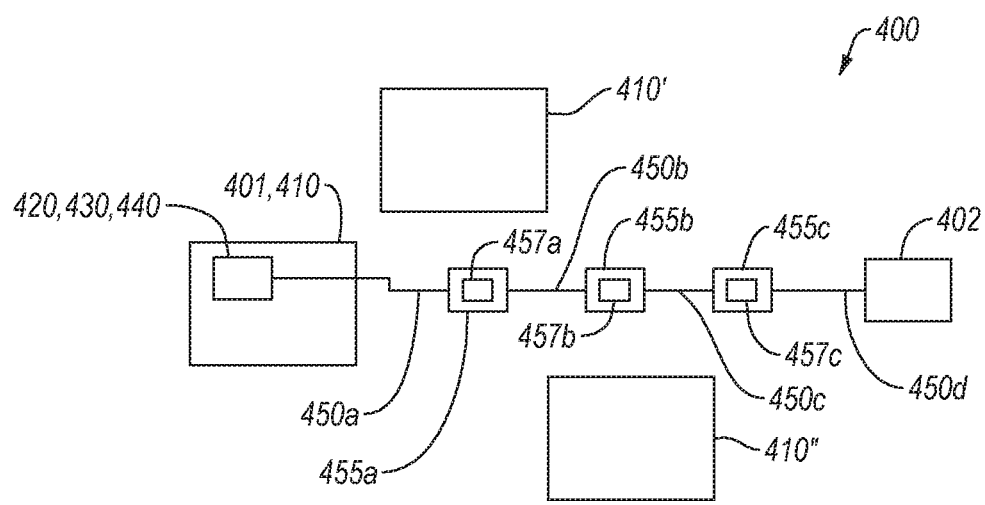
FIGS. 4A-4C are schematics of a system for processing and delivering entrained biomasses, according to various embodiments.
Figure 4B:
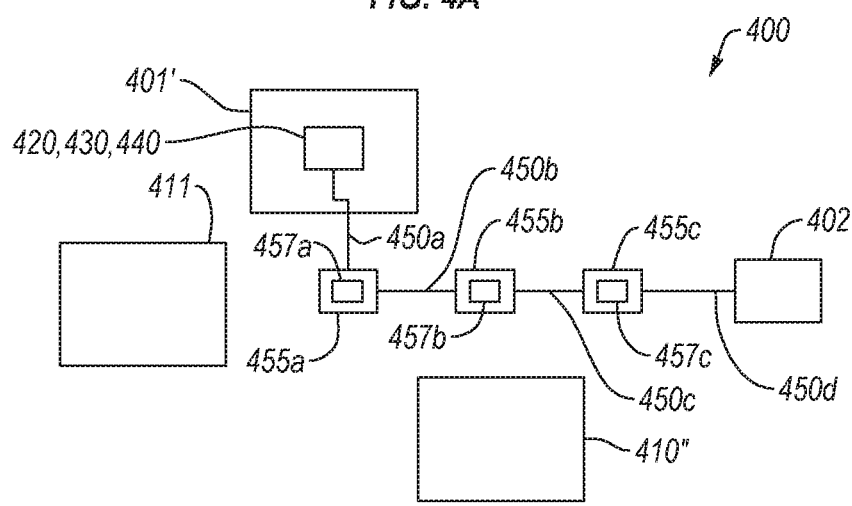
Figure 4C:
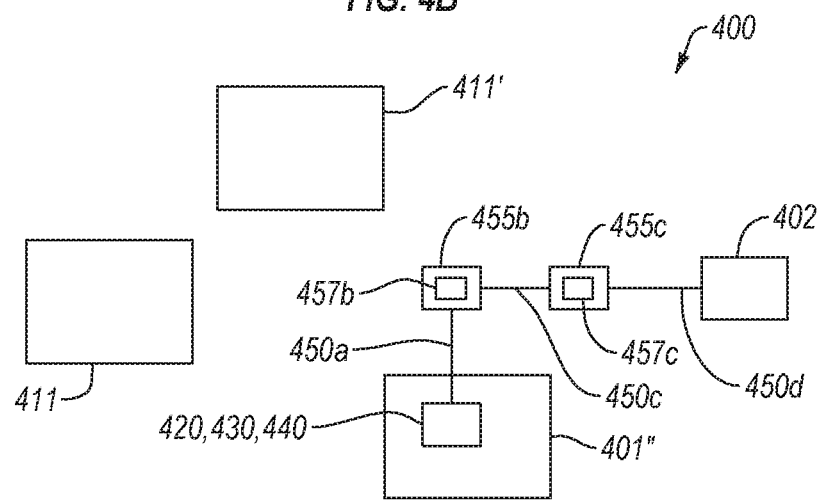

The substantially mobile and highly portable biomass processing and delivery system disclosed herein may increase the effective footprint of the processing equipment without transporting the biomass long distances—such as by truck—to the processing equipment or without requiring baling, drying, or wetting of any kind of the as-harvested biomass. FIGS. 4A-4C are schematics of a mobile and versatile delivery system 400 for entraining and delivering biomass from multiple locations, such as 401, 401', and 401", according to various embodiments. Each location 401, 401', or 401" may be acres or miles (e.g., 100 acres, 10 miles, or less than 25) from each other location 401, 401', and 401". Each location may include an associated unharvested biomass crop 410, 410', or 410". The system 400 may include biomass processing equipment (e.g., slurry apparatus 430, cleaning apparatus 440, booster pump(s), etc., as described herein), one or more moveable hubs 455a-455c (described generally as hub 455), a terminal end (e.g., end-use site 402) and one or more individual sections of transport conduit 450a-450d therebetween.

Depending on the topography, distance, size of transport conduit(s), size of booster pump(s), type of biomass being transported, liquid content of the biomass being transported, or combinations of any of the foregoing, hubs 455 may be placed at intervals in the delivery system 400. Each of the hubs 455 may include one or more of a connection between individual sections of the transport conduit 450, a booster pump 457, a control valve, or an access point for the system 400. In an embodiment, one or more hubs 455 may be set up between an on-site location 401 and an end-use location 402. Each hub 455 may include a booster pump 457 configured to maintain or otherwise control the velocity of the biomass slurry in the transport conduit 450. As illustrated, each of hubs 455a-455c includes a booster pump 457a-457c (referred to generally as booster pumps 457). The system 400 may include one hub 455 and/or associated booster pump 457 per mile of transport conduit 450, one hub 455 per one half mile of transport conduit 450, one hub 455 per quarter mile of transport conduit 450, one hub 455 per two miles of transport conduit 450, or at least one hub 455 per mile of transport conduit 450. A booster pump 457 at each hub 455 may maintain the constant or on demand flow of entrained biomass slurry to the end-use site 402.

Upon exhaustion of biomass at a first location 401, the mobile slurry apparatus 430, cleaning apparatus 440, booster pump(s), and at least some of the transport conduit 450 may be moved to a second location 401' or third location 401" while one or more of the hubs 455b or 455c (and associated booster pumps 457b and 457c) remain in the same position. In such a manner, only a limited amount of movement of one or more portions of the system 400 may be required, which may allow for a greater effective footprint with the same equipment without transporting the biomass long distances to the processing equipment. In some embodiments, one or more individual sections of transport conduit 450a-450c may be added or removed from the system 400 to vary the length of the system to reach various biomass sources.

As shown in FIG. 4A, biomass at a first location 401 may be harvested and processed as disclosed above. The biomass may be processed in a slurry apparatus 430 and a cleaning apparatus 440, and transported in transport conduits 450a-450d via one or more booster pumps 457. A booster pump 457 may be disposed at one or more of, hubs 455a-455c, at the cleaning apparatus and/or slurry apparatus, and/or at the end-use site 402. While only depicted with three hubs 455a-455c, the total number of hubs (and associated equipment, such as valves and/or booster pumps) may be one or more, such as one to three, two to five, four to ten, eight to fifteen, or less than twenty hubs (including any components thereof such as booster pumps). In FIG. 4A the transport conduits 450a-450d fluidly connect the first location 401 with the end-use site 402.

At a selected time, the slurry apparatus 430, cleaning apparatus 440 and associated booster pump(s) 457 may be transported (e.g., towed or driven) from the now harvested fields 411 to a second unharvested biomass crop 410'. As shown in FIG. 4B, the transport conduit 450a may be moved from the first location 401 to the second location 401' and may still fluidly connect the processing equipment to the hub 455a and associated booster pump 457a. The subsequent hubs 455b and 455c and associated transport conduits 450b-450d in the system 400 may be moved or remain in the substantially the same positions as in FIG. 4A to continue delivery of biomass slurry to the end-use site 402. The biomass in location 401' may be harvested and processed as described above with respect to FIGS. 1-3.

Upon exhaustion of the biomass at the second location 401', the slurry apparatus 430, cleaning apparatus 440 and associated booster pump(s) 457 (not shown) may be transported again (e.g., towed or driven) from the now harvested fields 411' to a third unharvested biomass crop 410". As shown in FIG. 4C, the transport conduit 450a may be moved from the second location 401' to the third location 401" and may now fluidly connect the processing equipment to the hub 455b and associated booster pump 457b. As shown, at least hub 455a, booster pump 457a, and transport conduit 450b (and/or at least one individual section of the transport conduit(s) 455a-455d) may be removed from the system 400 to accommodate a change in proximity of the processing equipment to the end-use site 402. In some embodiments, one or more hubs 455, booster pumps 457, and/or additional transport conduits 450 (or individual sections thereof) may be added to accommodate a change in proximity to the end-use site 402. The hubs 455b and/or 455c and associated transport conduits 450c and 450d in the system 400 may be moved or remain in the substantially the same positions as shown in FIGS. 4A and 4B to continue delivery of biomass slurry to the end-use site 402. The biomass in the third location 401" may be harvested and processed as described above with respect to FIGS. 1-3.

Upon exhaustion of the biomass at the third location 401", the slurry apparatus 430, cleaning apparatus 440 and associated booster pump(s) 457 may be transported again (e.g., towed or driven) from the now harvested fields 411' to a another biomass crop location (e.g., centralized location) or to storage. The mobility/portability of the system 400 allows for a greater effective footprint for the processing equipment while and maintaining minimal transport costs for the harvested biomass. While the biomass processing equipment (on-site storage 420, slurry apparatus 430, cleaning apparatus 440) are depicted in FIGS. 4A-4C as being within the area of the harvested or unharvested biomass crop (e.g., harvested field), in some embodiments, the biomass processing equipment may be adjacent to (e.g., within one or two miles, within one mile or less, or within one half mile or less) the biomass harvesting site. In such embodiments, the on-site storage 420, slurry apparatus 430, cleaning apparatus 440, associated booster pumps and transport conduits may be in a location adjacent to the unharvested biomass locations, such as at a centralized location therebetween or other location.

In some embodiments, substantially all of the transport conduit(s) 450, hubs 455, and associated booster pumps 457 or valves may be moved to a new centralized location for processing and transporting harvested biomass. In some embodiments (not shown), a plurality of transport conduits may converge at a single hub. For example, several smaller transport conduits may meet at the same hub, wherein a single larger diameter transport conduit or higher line speed conduit (e.g., from a higher-speed booster pump at the hub) carries the biomass of all of the smaller transport conduits. In some embodiments, the system may not include any hubs. For example, the system may only include a booster pump between the cleaning apparatus and the transport conduit.

While embodiments of systems for processing and transporting biomass from a field to an end user over relatively large distances are described above, in some embodiments, the systems disclosed herein may be used at or adjacent to (e.g., within one mile of) the end-use site. For example, an end-use site may include a large storage pad (e.g., 20 acre or larger storage pad, such as 40, 50, 60, 75, or 100 acres) for harvested biomass. In such embodiments, the storage pad may be within one mile, one half mile, or one quarter mile of a biomass processing facility, such as a bioreactor. In such embodiments, one or more of mobile processing equipment, flexible transport conduit, or hubs including booster pumps may be employed to process the as-harvested or as-stored biomass into slurried biomass on different portions of the storage pad. The portable processing equipment described herein may allow a user to process a portion of the stored biomass on the storage pad with minimal equipment (e.g., one loader or truck to transport the biomass to the slurry vessel). After the portion of as-harvested biomass adjacent the processing equipment one the storage pad has been slurried, a user may move the processing equipment to another portion of the storage pad to tap the stored biomass adjacent thereto. The portability and flexibility of the transport conduit(s) and processing equipment may eliminate the need for one or more pieces of rolling equipment such as front-end loaders or trucks. In some embodiments, only a front-end loader may be required at the storage pad.

One or more pieces of the equipment described with respect to the respective acts herein may be considered as one or more parts of a system for tapping, processing, and transporting biomass to an end user, with the system layout described throughout. The biomass slurry may be in a substantially sealed or closed system from the slurry apparatus to the end user sight or any points therebetween as described herein. In such sealed or closed systems, the slurry is passed from one piece of equipment to another piece of equipment via fluidly connected conduits, such as any of those described herein. The system may have discharge points and/or relief valves at one or more locations therein (e.g., at the hubs). The systems described herein may reduce or eliminate one or more costs and equipment necessary to harvest, process, and/or transport a biomass from the field to an end use site. The systems described herein may provide a portability system for slurrying and transporting biomass from the field to an end-use site. Such portable systems may reduce the need for building permanent or semi-permanent structures, rolling equipment, transport costs, and/or processing costs at an end-use site (e.g., the biomass may be delivered at or near an as-desired particle size, may be at least partially pre-cleaned, may be delivered in an unbailed state).

The methods described herein may reduce the manpower, energy, and equipment needed to harvest, store, and transport biomass from the field to an end user.

While various aspects and embodiments have been disclosed herein, other aspects and embodiments are contemplated. The various aspects and embodiments disclosed herein are for purposes of illustration and are not intended to be limiting.

What is claimed is:

1. A method of processing and transporting biomass to an end user, the method comprising:
    tapping a biomass for processing at a first site, wherein the biomass includes one or more of grasses, feed crops, stems, or residues thereof;

processing the biomass into a biomass slurry in a biomass slurry apparatus, the biomass slurry including a biomass weight percent (wt %) of 25 wt % to 50 wt % of the slurry and a selected average particle size;

cleaning the biomass slurry at the first site to remove at least one of sand, detritus, rocks, dirt, or other debris from the biomass slurry;

transporting the biomass slurry from the first site to an end-use off site spaced from the biomass slurry apparatus through a transport conduit after cleaning the biomass slurry; and controlling a velocity of the biomass slurry through the transport conduit using one or more booster pumps disposed in the transport conduit.

2. The method of claim 1, further comprising staging the biomass at the first site including storing the biomass in a centralized storage location proximate to a biomass slurry apparatus.

3. The method of claim 1, wherein tapping the biomass for processing includes removing at least a portion of biomass from a centralized storage location to a biomass slurry apparatus.

4. The method of claim 1, wherein processing the biomass into a biomass slurry includes breaking the biomass down to an average particle size of about 100 μm to about 50 mm.

5. The method of claim 1, wherein cleaning the biomass slurry includes routing the biomass slurry through a cleaning apparatus configured to remove the at least one of sand, detritus, rocks, dirt, or other debris.

6. The method of claim 5, wherein the cleaning apparatus includes a cyclonic cleaner.

7. The method of claim 1, wherein processing the biomass into a biomass slurry includes feeding the biomass into a biomass slurry apparatus including one or more of a pulper, chipper, shredder, or repulper.

8. The method of claim 7, further comprising moving the biomass slurry apparatus and at least a portion of the transport conduit to a new site that is spaced from the first site.

9. The method of claim 1, wherein the one or more booster pumps include at least two booster pumps that are one mile apart from each other in the conduit.

10. The method of claim 1, wherein the one or more booster pumps include at least two booster pumps that are a half mile apart.

* * * * *